United States Patent [19]

Lindquist

[11] Patent Number: 4,899,052
[45] Date of Patent: Feb. 6, 1990

[54] INFRARED DIAGNOSTIC INSTRUMENT

[75] Inventor: Donald F. Lindquist, Sweetwater, Tenn.

[73] Assignee: Eastern Gate, Inc., Jeffersonville, Ind.

[21] Appl. No.: 236,048

[22] Filed: Aug. 24, 1988

[51] Int. Cl.⁴ ................................................. G01J 1/44
[52] U.S. Cl. ................................... 250/342; 250/239; 250/338.1
[58] Field of Search ............... 360/74.6, 137; 250/340, 250/342, 206, 215, 338.1, 239

[56] References Cited

U.S. PATENT DOCUMENTS

| | | | |
|---|---|---|---|
| 2,976,419 | 3/1961 | Menke et al. | 250/338.1 |
| 3,754,139 | 8/1973 | Swithenbank et al. | 250/338.1 |
| 3,838,465 | 9/1974 | Fischer et al. | 360/137 |
| 3,919,631 | 11/1975 | Brown | 250/338.1 |
| 4,343,024 | 8/1982 | Kawai | 360/74.6 |

Primary Examiner—Carolyn E. Fields
Attorney, Agent, or Firm—Scott R. Cox

[57] ABSTRACT

A diagnostic instrument (10) for testing the functioning of an infrared radiation emitter (14) contained within a VCR (12) or other electrical equipment is disclosed. The instrument (10) comprises a housing (16) and an electronic circuit received within the housing (16) for detecting the presence of infrared radiation. The electronic circuit comprises a battery (26) or other DC power source electrically connected in series with an infrared sensitive photodetector (22) and a status LED (24) which is illuminated when the photodetector (22) is exposed to infrared radiation produced by the emitter (14). A switch (18) is provided for selectively turning the instrument (10) on and off. A battery condition LED (20) is also provided.

15 Claims, 2 Drawing Sheets

INFRARED DIAGNOSTIC INSTRUMENT

TECHNICAL FIELD

This invention relates to a diagnostic instrument for detecting the presence of infrared radiation which is useful in the repair of video cassette recorders and other devices which employ infrared switching circuitry.

BACKGROUND ART

The use of infrared radiation, sometimes called infrared light, in optical switching circuitry is well known. Typically, an infrared-emitting diode is employed to generate the infrared radiation which is directed through an optical path to an infrared detector, usually a solid state device such as a phototransistor or photothyristor, which functions as an "optical switch". When the optical path is blocked, the optical switch is turned off. For example, in a video-cassette recorder ("VCR") the technology is used to detect the beginning and ending of the video tape in the cassette. The tape in the cassette passes through the optical paths of the beginning-of-tape and end-of-tape detection devices. The magnetic coating on the tape blocks these optical paths; however, there are clear "leaders" at the beginning and ending of the tape which are transparent to infrared radiation. When these leaders pass through the beginning-of-tape or end-of-tape optical path, a signal is generated which triggers other VCR functions such as automatic on, off, or rewind.

The use of infrared optical switching in VCR's and other electrical/electronic equipment has created a need for a diagnostic instrument for testing the functioning of the infrared emitter(s) in the repair of these devices without requiring the removal of such emitter. Failures of the infrared emitter which is a part of the beginning-of-tape and end-of-tape detection circuitry in a VCR have been a source of frustration to VCR repair technicians in the past. When the emitter fails, the VCR simply will not operate at all when the power is turned on, a symptom of any of a number of possible problems. Accordingly, there is a real advantage in being able to quickly ascertain whether a failed emitter is the cause when this symptom is present. In the past, it has been necessary to remove the emitter from the circuit to test it, a process which takes approximately twenty minutes to complete and does not necessarily effect a repair of the VCR. Further, the voltage checks which have been commonly used in the past by technicians to test infrared emitters are not foolproof. This method sometimes indicates the emitter is good when, in fact, it has failed or is defective and will not emit infrared radiation as required.

Although various models of VCR's differ widely, the infrared emitter in the beginning-of-tape and end-of-tape circuitry is often located in a difficult to access position. An advantage of the present invention is that it may be inserted through the tape loading door or slot to test the emitter in a matter of seconds. Even if it were necessary to remove the case from the VCR to utilize the present invention, it would rarely add to the time necessary to effect repair of the VCR, as this is a step which is almost always performed by technicians when performing repairs.

Therefore, it is an object of the present invention to provide a VCR diagnostic instrument for checking the functioning of an infrared radiation emitter without removing such emitter from the VCR.

It is a further object of the present invention to provide a VCR diagnostic instrument which is dimensioned to be received within a VCR for testing the functioning of the infrared emitter with little or no disassembling of the VCR required.

It is also an object of the present invention to provide a method for testing the functioning of an infrared emitter which is more reliable than the method wherein electrical characteristics are checked at the terminals of such emitter.

It is another object of the present invention to provide a VCR diagnostic instrument for testing the functioning of an infrared radiation emitter which is self-contained and requires no external power source.

It is yet another object of the present invention to provide a VCR diagnostic instrument which is battery powered and includes a means for ascertaining battery condition.

It is another object of the present invention to provide a VCR diagnostic instrument which is simple and convenient to use.

It is a further object of the present invention to provide a VCR diagnostic instrument which is inexpensive to manufacture and maintain.

It is also an object of the present invention to provide a diagnostic instrument for checking the functioning of an infrared radiation emitter utilized in equipment other than VCR's.

DISCLOSURE OF THE INVENTION

Other objects and advantages will be accomplished by the present invention which provides a VCR diagnostic instrument for testing the functioning of an infrared radiation emitter. The VCR diagnostic instrument of the present invention comprises a housing dimensioned for being received within a VCR for testing the functioning of an infrared emitter contained within such VCR while requiring little or no disassembly of the VCR. Received within the housing is an electronic circuit for detecting the presence of infrared radiation. The electronic circuit comprises at least one battery for a power supply, switch means for selectively turning the instrument on and off, an infrared sensor, and status LEDs (light-emitting diodes) for indicating battery condition and the presence (or lack thereof) of infrared radiation.

BRIEF DESCRIPTION OF THE DRAWINGS

The above-mentioned features of the invention will become more clearly understood from the following detailed description of the invention read together with the drawings in which.

BEST MODE FOR CARRYING OUT THE INVENTION

Figure 1:
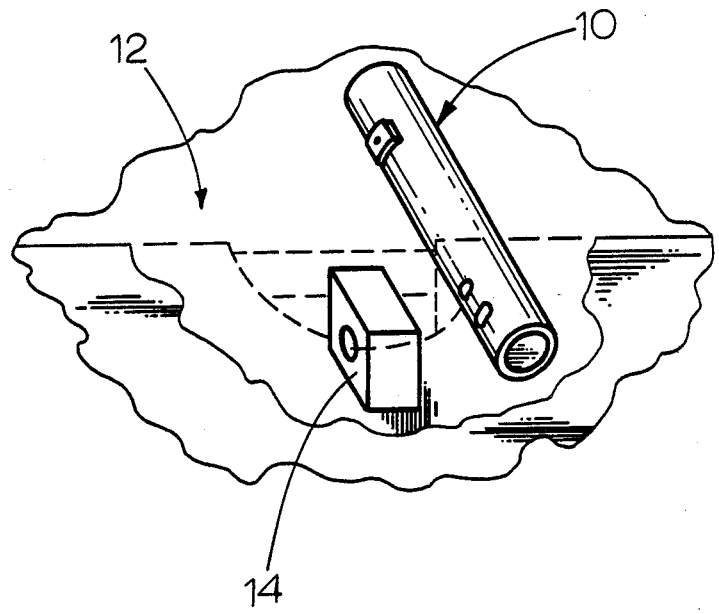
FIG. 1 illustrates a perspective view of a VCR diagnostic instrument of the present invention with a portion of a VCR shown in partial cross-section.
Figure 2:
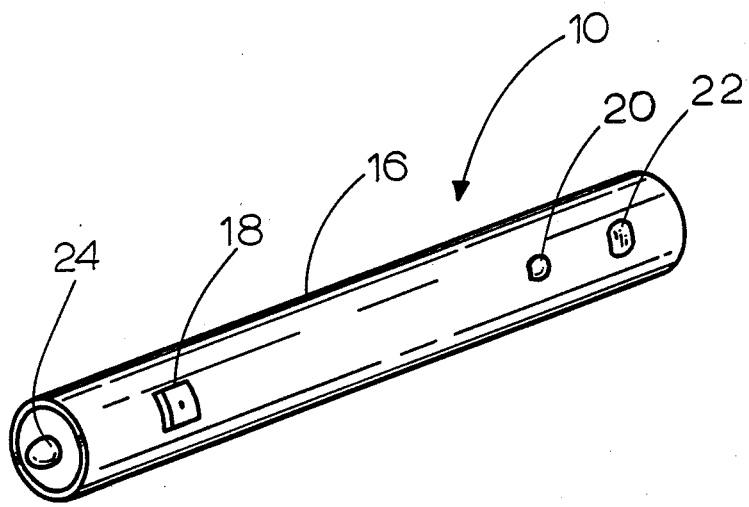
FIG. 2 illustrates a perspective view of a VCR diagnostic instrument of the present invention.

A VCR diagnostic instrument incorporating various features of the invention is shown generally at 10 in FIGS. 1 and 2. In FIG. 1, the instrument 10 is shown as it might appear when inserted into a VCR, partially illustrated at 12, to test the functioning of the infrared emitter 14 incorporated within the VCR 12.

Figure 3:
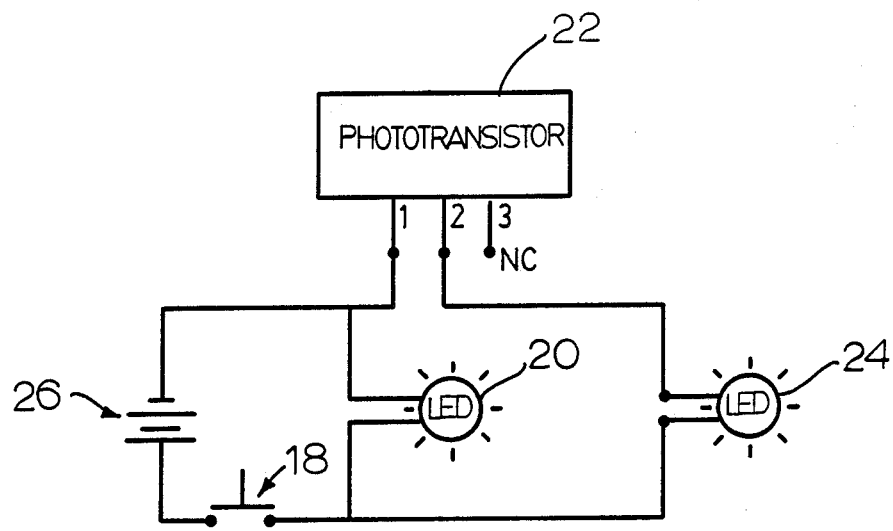
FIG. 3 illustrates a schematic of the electronic circuitry of a VCR diagnostic instrument of the present invention.
Figure 4:
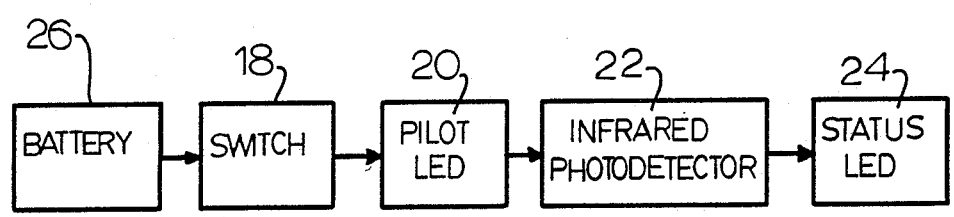
FIG. 4 illustrates a block diagram of the electronic circuitry of a VCR diagnostic instrument of the present invention.

In the preferred embodiment, the VCR diagnostic instrument 10 of the present invention comprises a housing shown at 16 in FIG. 2 which contains the components which comprise the electronic circuitry of the instrument 10. The housing 16 is substantially cylindrical in shape and is dimensioned to receive therein two size AA 1.5 V batteries connected in series and shown in symbol form at 26 in the schematic diagram of the electronic circuitry of the present invention shown in FIG. 3. Referring to FIG. 3, the batteries 26 are electrically connected in series with a photodetector 22, a status LED (light-emitting diode) 24 and a switch 18. In the preferred embodiment, the switch 18 comprises a microswitch. A pilot LED 20 is electrically connected in series with the batteries 26 and the switch 18 and in parallel with the photodetector 22 and status LED 24. The photodetector 22 is an infrared sensitive semiconductor device which functions as a switch which is closed when its "window" is exposed to a threshold level of infrared radiation "visible" at its "window". Referring to FIG. 2, the preferred physical locations of the switch 18, the LEDs 20 and 24, and the sensor or photodetector 22 are illustrated. It will be appreciated by those skilled in the art that the positioning of these components may be varied to accommodate different applications. Although not shown in FIG. 2, the batteries 26 are contained within an interior volume defined by the housing 16 of the instrument 10.

It will be appreciated from the foregoing that when the switch 18 is closed, power will be supplied from the batteries 26 to the pilot LED 20 which will then be illuminated if the batteries are in a properly charged condition; conversely, if the batteries 26 are excessively discharged, the pilot LED 20 will not be lit or will be dim when the switch 18 is closed. When the instrument 10 is inserted into a VCR 12 (with the VCR power on and the switch 18 closed), such that the sensor, i.e. the "window" of the, photodetector 22, is adjacent the infrared emitter 14 as shown in FIG. 1, the infrared radiation emitted by the emitter 14 will cause the photodetector 22 to appear as a closed switch in the circuit and the status LED 24 will be illuminated, indicating that the emitter 14 is functioning properly. Conversely, if the emitter is not functioning properly, the photodetector 22 will appear as an open switch in the circuit and the status LED 24 will not be illuminated. Accordingly, a VCR diagnostic instrument is provided for quickly and easily testing the functioning of an infrared radiation emitter in a VCR without requiring the removal of the emitter from the VCR.

Although the invention has been described with respect to its application to the diagnosis of VCR problems, it will be useful in the trouble-shooting of other equipment which contain infrared radiation emitters, e.g. industrial controls, punched card or tape readers, and other optical switching applications. Further, it will be appreciated by those skilled in the art that functional equivalents may be substituted for the electronic components. For example, the power source is not limited to size AA batteries nor are the display means limited to LEDs; other size and/or type batteries and display means such as liquid crystal or fluorescent might be substituted. The physical dimensions of the present invention may be varied considerably to suit a variety of applications.

While a preferred embodiment has been shown and described, it will be understood that it is not intended to limit the invention to such disclosure, but rather it is intended to cover all modifications and alternate constructions falling within the scope of the invention as defined in the appended claims.

What is claimed:

1. A diagnostic instrument for the detection of infrared radiation in the repair of electronic equipment containing an infrared radiation emitter, said instrument comprising:

a housing dimensioned for being received within said equipment; and an electronic circuit received within said housing, said circuit comprising means for testing the functioning of an infrared emitter while said emitter is contained within said equipment, said means for testing being operable to detect the presence of infrared radiation emitted from said infrared radiation emitter, wherein the amount of disassembly of said equipment required to effect said testing is minimized.

2. The diagnostic instrument of claim 1 wherein said electronic circuit comprises a DC power source electrically connected in series with an infrared sensitive photodetector and a light-emitting diode, whereby said light-emitting diode emits light when said photodetector is exposed to infrared radiation.

3. The diagnostic instrument of claim 2 wherein said electronic circuit further comprises a switch electrically connected in series with said DC power source for selectively turning said instrument on and off.

4. The diagnostic instrument of claim 3 wherein said DC power source comprises at least one battery.

5. The diagnostic instrument of claim 4 wherein said electronic circuit further comprises a second light-emitting diode electrically connected in series with said at least one battery and said switch, whereby said second light-emitting diode emits light when said switch is closed and said at least one battery is in a properly charged condition.

6. The diagnostic instrument of claim 1 wherein said housing comprises an elongated body of substantially cylindrical shape.

7. A diagnostic instrument for the detection of infrared radiation in the repair of electronic equipment containing an infrared radiation emitter, said instrument comprising:

a housing comprising an elongated body of substantially cylindrical shape dimensioned for being received within said equipment; and an electronic circuit received within said housing, said circuit comprising means for testing the functioning of an infrared emitter while said emitter is contained within said equipment, said means for testing being operable to detect the presence of infrared radiation emitted from said infrared radiation emitter, wherein the amount of disassembly of said equipment required to effect said testing is minimized, said electronic circuit comprising at least one battery connected in series with a switch, an infrared sensitive photodetector, and a first light-emitting diode, whereby said first light-emitting diode emits light when said switch is closed and said photodetector is exposed to infrared radiation; and battery condition display means comprising a second light-emitting diode electrically connected in series with said at least one battery and said switch to form a complete circuit, whereby said second light-emitting diode emits light when said switch is closed and said at least one battery is in a properly charged condition.

8. The diagnostic instrument of claim 7 wherein said housing defines a first end portion and an oppositely disposed second end portion, and said switch and said first light-emitting diode are received in said housing proximate said first end portion, and said photodetector is received in said housing proximate said second end portion.

9. A method for determining the functioning of an infrared emitter in a piece of electrical/electronic equipment, said method comprising the steps of:

placing said equipment in a condition whereby said emitter will be emitting infrared radiation if functioning properly;

inserting an instrument having an infrared sensor and display means into said equipment, said instrument being constructed such that said display means provides indicia of whether said infrared sensor is exposed to a certain threshold level of infrared radiation;

placing said infrared sensor adjacent said infrared emitter; and observing said display means for indicia of the proper functioning of said infrared emitter.

10. The method of claim 9 wherein said equipment is provided with a "POWER ON" switch and the first mentioned step comprises closing said "POWER ON" switch while said equipment is appropriately connected to a normal source of power.

11. The method of claim 10 wherein said step of inserting said instrument into said equipment comprises first opening a videocassette loading door and then inserting said instrument through an opening thereby provided.

12. The method of claim 10 wherein said step of inserting said instrument into said equipment comprises first removing a housing/cover from a chassis of said equipment and then inserting said instrument into said chassis thereby accessed.

13. The method of claim wherein said equipment is a VCR and said instrument comprises:

a housing dimensioned for being received within said VCR for testing the functioning of an infrared emitter contained within said VCR; and an electronic circuit received within said housing for detecting the presence of infrared radiation emitted from said emitter, said circuit comprising a sensor electrically connected in series with a DC power source and display means, said sensor comprising a photodetector and said display means comprising a light emitting diode whereby said light emitting diode emits light when said sensor is exposed to infrared radiation.

14. The method of claim 13 wherein said electronic circuit further comprises a switch electrically connected in series with said DC power source for selectively turning said instrument on and off, and said method further comprises the additional step of closing said switch prior to the steps of observing said display means.

15. The method of claim 14 wherein said DC power source is at least one battery, and said circuit further comprising a second light-emitting diode electrically connected such that said second light-emitting diode emits light when said switch is closed and said at least one battery is in a properly charged condition, thereby providing means for checking the condition of said at least one battery; and said method further comprising the additional step of observing said second light-emitting diode to ascertain that said at least one battery is in a properly charged condition after the step of closing said switch and prior to the step of observing said display means.

* * * * *